Patented Aug. 31, 1948

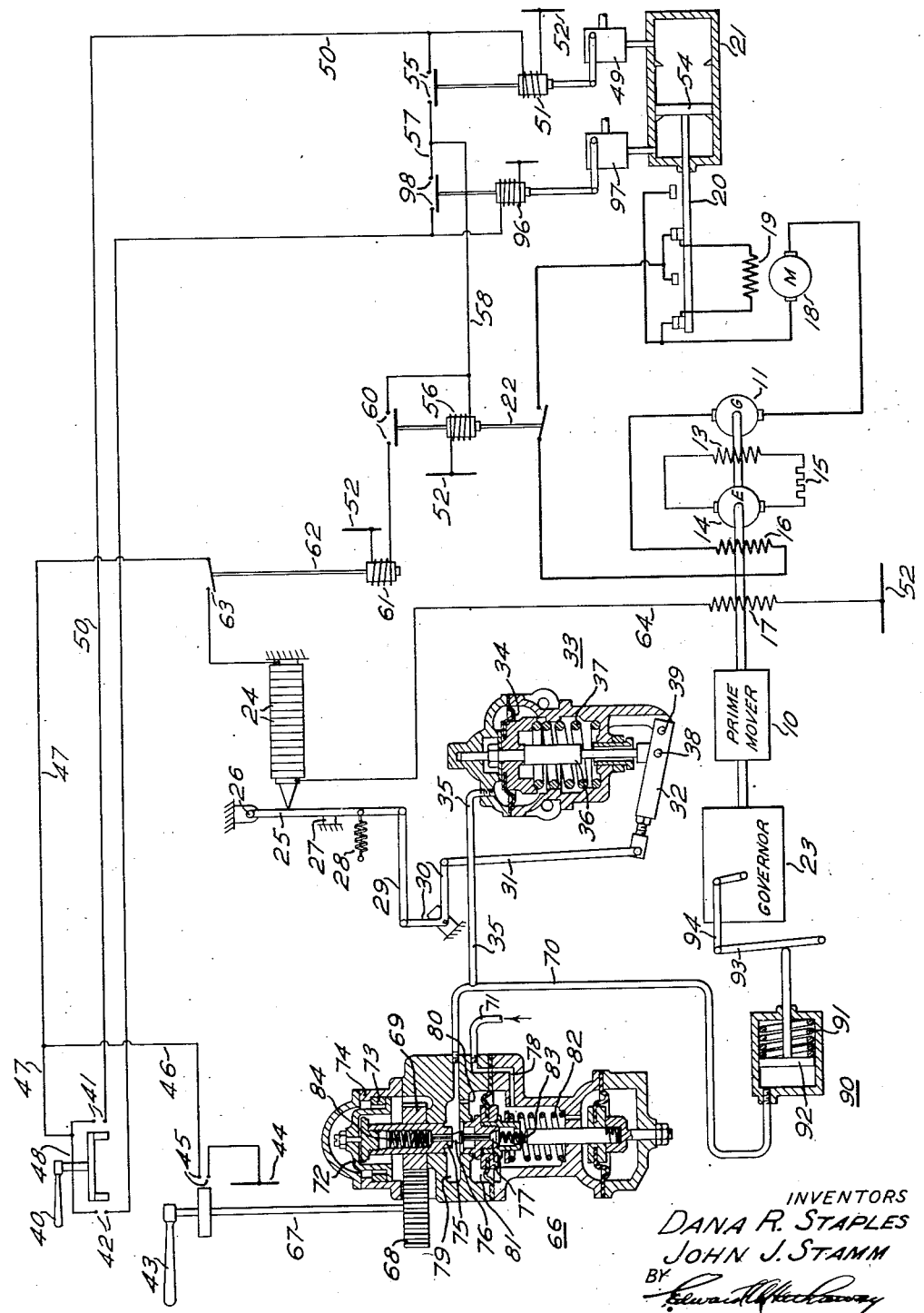

2,448,284

UNITED STATES PATENT OFFICE 2,448,284

CONTROL SYSTEM FOR ENGINE GENERATOR UNITS

Dana R. Staples, Ridley Park, and John J. Stamm, Chester Heights, Pa., assignors to The Baldwin Locomotive Works, a corporation of Pennsylvania Application December 22, 1945, Serial No. 637,066

5 Claims. (Cl. 290—17)

This invention relates to motor control systems of the type in which a generator supplies power to motors and has for an object the provision of means for gradually and smoothly increasing or decreasing the power supplied to the motors under the control of a manually operable master controller.

In locomotives provided with a prime mover such as an internal combustion engine or Diesel engine, together with a generator driven thereby for supply of power to traction motors, it is desirable in many cases to have the application of power under the control of an engineman and to minimize change of power for each step of the engineman's throttle.

In carrying out the present invention in one form thereof, the excitation of the main power generator of the locomotive is controlled in accordance with the movement of the engineman's throttle. There has been eliminated step by step changes in the excitation. For each movement of the throttle there is a corresponding change in the excitation of the main generator. Moreover, after full excitation has been produced on the main generator, the throttle then increases the power developed by the prime mover in accordance with the position of the throttle.

For a more complete understanding of the invention and for further objects and advantages thereof, reference should be had to the following description taken in conjunction with the accompanying drawing which diagrammatically illustrates a typical embodiment of the invention.

Referring to the drawing, the invention in one form has been shown as applied to a locomotive of the type in which a suitable prime mover, as a Diesel engine 10, is utilized to drive a main power generator 11 having a separately excited field winding 13. Though the excitation of the field winding 13 may be directly controlled by means of variable resistors, it is shown as under the control of an exciter 14 also driven by the Diesel engine 10. A resistor 15 may be included in the circuit including the main field winding 13 of the generator 11. The exciter 14 is provided with a differential field winding 16 connected in series with the generator 11. The exciter is also provided with a separately excited field winding 17. The generator is arranged to supply current to one or more motors only one of which, the motor 18, is shown. It is provided with a series field winding 19, the polarity of which is under the control of a reversing switch 20 operated by pneumatic means 21. The supply of power to the motor 18 is under the control of a contactor 22.

The prime mover 10 is provided with a governor 23 for controlling the power output thereof.

The excitation of exciter 14 is controlled by means of a variable resistor, preferably a carbon pile 24, the resistance of which may be gradually decreased by rotation of the lever 25 in a counter-clockwise direction around its pivot 26. Normally, the lever 25 is biased against a stop 27 by means of a spring 28. The lever 25 is actuated through a link 29, a crank arm 30, a link 31 and a lever 32 operable by a pneumatic device 33. The device 33 consists of a flexible diaphragm 34 which upon application of air pressure thereto as by way of pipe 35 moves a rod 36 downwardly against the bias of a spring 37. The rod is pivoted at 38 to the lever 32 which is also pivoted at 39. Thus as air pressure is applied to the device 33 the resistance of the carbon pile 24 decreases and as the air pressure is relieved the springs 37 and 28 produce an increase in the resistance of the carbon pile 24.

In the operation of the invention, the locomotive operator or engineman first moves a lever 40 to the right or the left partially to complete an energizing circuit through the forward or reverse contacts 41 and 42. He thereupon moves the main controller handle or throttle 43 to its first position to complete a circuit from a supply line 44 through contacts 45 and by way of conductors 46 and 47 to a conductor 48 connected to one of the terminals of each of the forward and reverse contacts 41 and 42. Thus, upon movement of the handle 40 to close the contacts 41, an energizing circuit is completed for the operating coil 51 of a valve 49. This circuit may be traced from the contacts 41 by way of conductor 50, the operating coil 51 and to the other supply line 52. Thereupon the valve 49 will be opened to admit air into the pneumatic actuator 21 to move the piston 54 to the illustrated position for connection of the series winding 19 for forward rotation of the motor 18. The coil 51 also closes contacts 55 to complete an energizing circuit for the operating coil 56 of the contactor 22. This circuit is the same as the one previously traced up to the point of connection to the contacts 55 by conductor 50. The circuit then extends by way of conductors 57 and 58 to the operating coil 56 and thence to the other supply line 52. The contactor 22 thereupon closes to connect the generator 11 to the motor 18 and also to close contacts 60 to complete an energizing circuit for the operating coil 61 of a contactor 62. This contactor thereupon closes to complete the energizing circuit for the field winding 17. This circuit may be traced by way of the supply line 44, contacts 45, conductors 46 and 47, contacts 63, carbon pile 24, conductors 64 and by the field winding 17 to the other supply line 52.

It will be remembered that the carbon pile 24 is fully expanded; that is, no pressure has been applied thereto and its electrical resistance is a maximum. In consequence, there is little flow of current through the field winding 17 upon closure of the contactor 62.

The foregoing operations take place rapidly. It is unnecessary for the engineman to hold the throttle 43 in the first position. After operation of the lever 40 the main throttle 43 is moved to its first position for closure of the contacts 45 and progressively in the same direction to increase the power supply to the motor 18. This is accomplished by a pneumatic controller 66 directly operable by the throttle 43 by means of a shaft 67 which drives a gear 68 in mesh with a gear 69 of the controller 66. The operation of the controller 66 is well understood by those skilled in the art and it serves to deliver to the pipes 35 and 70 air at a pressure dependent upon the position of the throttle 43. The controller 66 is supplied with air at suitable pressure by way of supply pipe 71. Briefly, the operation of the controller 66 is as follows. The gear 69 rotates a cam yoke 72 which is moved downwardly by the cam 73 carried by the housing 74. The downward movement of the yoke 72 moves the exhaust valve seat 75 downwardly into engagement with the exhaust valve 76. Further movement of the yoke 72 unseats an inlet valve 77 permitting air to flow from the supply line 71 through the chamber 78 upwardly through the inlet valve 77 and into a cavity 79 to which is connected the pipes 70 and 35. Thus, the air pressure in these pipes is immediately increased. However, it will be observed the increased air pressure is applied through an opening 80 to the upper side of diaphragm 81 which is thereby moved downwardly to reseat the inlet valve 77. If the throttle 43 is moved a greater distance, the yoke 72 will be moved downwardly again to open the inlet valve 77 and further to increase the pressure delivered to the supply pipes 35 and 70. The springs 82, 83 and 84 are selected in terms of the pressure to be maintained in the supply pipes 35 and 70. It is to be understood that reverse movement of the throttle 43 will permit the springs to lift the yoke 72 thus lifting the exhaust valve seat 75 to unseat the valve 76 releasing air from the supply lines 35 and 70, from the cavity or chamber 79 and from above the diaphragm 81 by way of the opening 80. However, as the air pressure decreases above the diaphragm 81, the spring 82 raises the exhaust valve 76 to its closed position. Thus the pressure in the lines 35 and 70 is controlled with the extent of movement of the throttle 43.

The rising pressure in the line 35 is applied to the pneumatic actuator 33. Consequently, its lever 32 is moved in accordance with the movement of the main throttle 43; that is, the movements are related until the lever 32 operates the lever 25 fully to compress the carbon pile resistor 24 to reduce its resistance to a minimum. The result of the foregoing is that the excitation current for the field winding 17 is increased at a rate corresponding with the movement of the main controller 43 and the rate of rise of the air pressure supplied to the actuator 33. Accordingly, the excitation of the main field winding 13 of the generator 11 is increased and power supplied to the motor 18 is likewise increased.

It is a feature of the present invention that the governor or throttle 23 of the prime mover 10 is also under the control of the main controller handle 43. This is accomplished by providing a pneumatic actuator 90 having a spring 91 which is stronger than the spring 37 of the actuator 33. The arrangement is such that the piston 92 of the actuator 90 does not begin to move until the air pressure has moved the lever 32 fully to compress the carbon pile resistor 24. Thereafter, additional movement of the main controller handle 43 further increases the pressure in the pipe 70 and thus moves the piston 92 and through links 93 and 94 moves the governor or throttle 23 of the primer mover 10 in a direction to increase the power delivered to the generator 11.

It will now be understood that the system may be modified without departing from the invention; for example, the spring 91 may be selected or set for operation of the actuator 91 before the carbon pile resistor 24 has been fully compressed. However, in accordance with the invention the locomotive operator not only has control over the application of power to the motors during starting but he is also assured of smooth starting due to the increase in excitation of the main generator 11 prior to substantial movement of the throttle 23 to increase the power delivered to the generator and the motors. The increasing flow of power is relatively important in starting a locomotive because the application of power at a high rate frequently results in wheel slippage. In accordance with the invention, a locomotive and train increases its speed at a smooth even rate uninterrupted by jerks or jolts which are commonly associated with the starting of a train.

When the controller handle 43 is rotated toward its initial position it will be understood the foregoing operations will be carried out in reverse order. When the initial position is reached, the contacts 45 will be opened to de-energize the operating coils 51, 56 and 61.

For reverse movement of the train or locomotive, the reversing lever 40, with the motor 18 de-energized, is moved to open the previously closed contacts 41 and to close the contacts 42. The circuit to the operating coil 51 is thereby opened for operation of the valve 49 to its closed position. An energizing circuit is partially completed for the operating coil 96 of a valve 97 which admits air to the opposite side of piston 54 for movement of the reversing switch to its other position. Contacts 98 serve to complete the circuit to the operating coil 56 of the contactor 22. Upon movement of the controller handle 43 to its first position the operations first described are again carried out for acceleration of the motor 18, this time in the reverse direction.

While a preferred embodiment of the invention has been described, it is to be understood modifications may be made within the scope of the appended claims.

What is claimed is:

1. The combination with an engine, a generator driven thereby and at least one motor supplied by said generator, of means for controlling the excitation of said generator comprising a variable resistor, a pneumatic actuator biased to one position and operable from that position under pneumatic pressure for gradually changing the resistance of said resistor between minimum and maximum values, a pressure regulator for controlling the pressure to said actuator, control means operable through a plurality of positions for adjusting said regulator for application of different pressures to said actuator, and pneumatic means operable as said resistor develops its minimum resistance for increasing the power delivered by said engine to said generator.

2. The combination with an engine, a generator driven thereby and at least one driving motor supplied to said generator, of means for controlling the excitation of said generator comprising an adjustable resistor, a pneumatic actuator for said adjustable resistor biased to one position and operable through a range of movement to change the resistance of said resistor, a pressure regulator having a control member the position of which determines the pressure applied to said actuator, control means connected to said control member and operable through a plurality of positions smoothly to vary said air pressure from a minimum to a maximum pressure smoothly to change the resistance of said resistor from maximum to minimum values, for a change in air pressure from said minimum value to one below said maximum value, load-controlling means for said engine, a second pneumatic actuator for said load-controlling means and operable at said minimum pressure to limit the output of said engine and operable after said resistor develops its minimum resistance for increasing to its full load value the power delivered by said engine to said generator.

3. The combination with an engine, a generator driven thereby and at least one motor supplied by said generator, of means for controlling the excitation of said generator comprising a carbon pile resistor, a pneumatic actuator for gradually changing the resistance of said resistor between minimum and maximum values, a pressure regulator for controlling the pressure to said actuator, control means operable through a plurality of positions for adjusting said regulator for application of different pressures to said actuator, and pneumatic means operable as said resistor develops its minimum resistance for increasing the power delivered by said engine to said generator.

4. The combination with an engine, a generator driven thereby and at least one motor supplied by said generator, of a field winding for said field generator, an exciter for said field winding, a field winding for said exciter, a carbon pile resistor connected in circuit with said exciter field winding for controlling the excitation thereof, a pneumatic actuator operable upon application of pressure to reduce the resistance of said resistor to a minimum value, a regulator for varying the pressure applied to said actuator, a controller operable through a plurality of positions for adjusting said regulator gradually and uniformly to change the pressure applied to said actuator for smoothly and gradually changing the excitation of said exciter, a throttle for said prime mover, and a pneumatic actuator therefor connected to said regulator for controlling the setting of said throttle, said second named actuator being effective only after said first-named actuator has reduced the resistance of said carbon pile resistor to substantially its minimum value.

5. The combination with an engine, a generator driven thereby and at least one motor supplied by said generator, of means for controlling the excitation of said generator comprising a resistor of the compressible type, a pneumatic actuator therefor, a pressure regulator having a control member the position of which determines the pressure applied to said actuator, control means connected to said control member and operable through a plurality of positions smoothly to vary said air pressure from a minimum to a maximum pressure smoothly to change the resistance of said resistor from maximum to minimum values, for a change in air pressure from said minimum value to one below said maximum value, load-controlling means for said engine, a second pneumatic actuator for said load-controlling means and operable at said minimum pressure to limit the output of said engine and operable after said resistor develops its minimum resistance for increasing to its full load value the power delivered by said engine to said generator.

DANA R. STAPLES.
JOHN J. STAMM.

REFERENCES CITED

The following references are of record in the file of this patent:

UNITED STATES PATENTS

| Number | Name | Date |
|---|---|---|
| 776,223 | Deutsch | Nov. 29, 1904 |
| 790,819 | Dorman | May 23, 1905 |
| 1,216,237 | Lemp | Feb. 13, 1917 |
| 1,271,788 | Snee, Jr. | July 9, 1918 |
| 1,745,130 | Turner | Jan. 28, 1930 |
| 1,821,827 | Brandenstein | Sept. 1, 1931 |
| 1,891,936 | Lemp | Dec. 27, 1932 |
| 2,050,068 | Schaer | Aug. 4, 1936 |
| 2,060,900 | Simmen | Nov. 17, 1936 |
| 2,131,527 | Sousedik | Sept. 27, 1933 |
| 2,180,138 | Brunner | Nov. 14, 1939 |
| 2,231,521 | Curry | Feb. 11, 1941 |
| 2,290,867 | Curry | July 28, 1942 |
| 2,424,121 | Schlapfer | July 15, 1947 |

Certificate of Correction

Patent No. 2,448,284.

August 31, 1948.

DANA R. STAPLES ET AL.

It is hereby certified that error appears in the printed specification of the above numbered patent requiring correction as follows: Column 5, line 6, claim 2, for the words "to said" read *by said*; and that the said Letters Patent should be read with this correction therein that the same may conform to the record of the case in the Patent Office.

Signed and sealed this 16th day of November, A. D. 1948.

[SEAL]

THOMAS F. MURPHY,
*Assistant Commissioner of Patents.*